(12) United States Patent  
Xia et al.

(10) Patent No.: US 11,886,347 B2  
(45) Date of Patent: Jan. 30, 2024

(54) LARGE-SCALE DATA PROCESSING COMPUTER ARCHITECTURE

(71) Applicant: Xi'an Jiaotong University, Shaanxi (CN)

(72) Inventors: Tian Xia, Shaanxi (CN); Pengju Ren, Shaanxi (CN); Haoran Zhao, Shaanxi (CN); Zehua Li, Shaanxi (CN); Wenzhe Zhao, Shaanxi (CN); Nanning Zheng, Shaanxi (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 17/864,014

(22) Filed: Jul. 13, 2022

(65) Prior Publication Data

US 2022/0350745 A1     Nov. 3, 2022

Related U.S. Application Data

(63) Continuation of application No. PCT/CN2020/087814, filed on Apr. 29, 2020.

(30) Foreign Application Priority Data

Apr. 27, 2020    (CN) .......................... 202010343215.9

(51) Int. Cl.
     *G06F 12/0862*      (2016.01)
     *G06F 9/355*      (2018.01)
     (Continued)

(52) U.S. Cl.
     CPC ........ *G06F 12/0862* (2013.01); *G06F 9/3555* (2013.01); *G06F 9/3838* (2013.01);
     (Continued)

(58) Field of Classification Search
     CPC .. G06F 12/0862; G06F 9/3555; G06F 9/3838; G06F 9/3887; G06F 12/0813; G06F 2212/1021
     See application file for complete search history.

(56) References Cited

U.S. PATENT DOCUMENTS

2019/0392297 A1    12/2019   Lau et al.

FOREIGN PATENT DOCUMENTS

| CN | 106126372 A | 11/2016 |
|---|---|---|
| CN | 108596331 A | 9/2018 |

(Continued)

OTHER PUBLICATIONS

International Search Report of PCT/CN2020/087814.
Written Opinion of PCT/CN2020/087814.

*Primary Examiner* — Gurtej Bansal
(74) *Attorney, Agent, or Firm* — Dragon Sun Law Firm, PC; Nathaniel Perkins

(57) ABSTRACT

Computing architecture comprises an off-chip memory, an on-chip cache unit, a prefetching unit, a global scheduler, a transmitting unit, a pre-recombination network, a post-recombination network, a main computing array, a write-back cache unit, a data dependence controller and an auxiliary computing array. The architecture reads data tiles into an on-chip cache in a prefetching mode, and performs computing according to the data tiles; in the computing process of the tiles, a tile exchange network is adopted to recombine a data structure, and a data dependence module is arranged to process a data dependence relationship possibly existing between different tiles. According to the computing architecture, the data utilization rate can be increased, the data processing flexibility is improved, and therefore Cache Miss is reduced, and the memory bandwidth pressure is reduced.

10 Claims, 15 Drawing Sheets

(51) Int. Cl.
*G06F 9/38* (2018.01)
*G06F 12/0813* (2016.01)

(52) U.S. Cl.
CPC ........ *G06F 9/3887* (2013.01); *G06F 12/0813* (2013.01); *G06F 2212/1021* (2013.01)

(56) References Cited

FOREIGN PATENT DOCUMENTS

| | | |
|---|---|---|
| CN | 108769684 A | 11/2018 |
| CN | 109447241 A | 3/2019 |
| CN | 110727911 A | 1/2020 |

LARGE-SCALE DATA PROCESSING COMPUTER ARCHITECTURE

CROSS-REFERENCE TO RELATED APPLICATIONS

This application is a bypass continuation application of PCT application no.: PCT/CN2020/087814. This application claims priorities from PCT Application PCT/CN2020/087814, filed Apr. 29, 2020, and from the Chinese patent application 202010343215.9 filed Apr. 27, 2020, the contents of which are incorporated herein in the entirety by reference.

TECHNICAL FIELD

The disclosure belongs to the technical field of large-scale data processing, and particularly relates to computing architecture.

BACKGROUND

Large-scale linear equation set solution and matrix operation are one of the most key operations in modern scientific computing and engineering computing. At present, this type of operation mainly depends on a high-performance linear algebraic library, such as CUBLAS of a GPU platform, and computing libraries such as Linear Algebra Package (LAPACK), Intel Math Kernel Library (MKL) and the like of a CPU platform. A matrix inversion and equation set solving algorithm based on LU decomposition is generally adopted in this type of computing libraries, and the computing libraries are realized by using a Single Instruction Multiple Data (SIMD) style of a high-parallelism arithmetic unit, so that parallelization of data processing is realized to the maximum extent. However, for a large-scale problem, operational data cannot be completely stored in an on-chip cache (such as a multi-level Cache), so that data transfer between the on-chip memory and an off-chip memory (such as a DDR memory) needs to be carried out. For example, for a single-precision floating-point matrix of the size of 4096*4096, the data size is 64 MB, which is much larger than the overhead that can be borne by the on-chip memory. Meanwhile, the data access characteristics in equation set solving and matrix operation problems are as follows: 1) the data locality is poor, 2) the data access mode is irregular, and 3) the data structure needs to be randomly recombined online. When the data processing scale is very large, the above characteristics cause huge pressure on traditional high-performance computing libraries such as CUBLAS and MKL. Specifically, when this type of computing libraries is used for processing large-scale equation set solution and matrix operation, the problems of frequent Cache Miss and low computing efficiency inevitably occur. At the moment, the extremely low Cache utilization rate and the limited memory bandwidth become main bottlenecks of restricting the performance, and the overall computing performance is seriously restricted.

SUMMARY

In order to solve the above problems, the disclosure provides computing architecture which comprises an off-chip memory, an on-chip cache unit, a transmitting unit, a pre-recombination network, a post-recombination network, a main computing array, a data dependence controller and a global scheduler, wherein the off-chip memory is used for storing all large-scale data in the format of tiles, wherein the large-scale data is divided into a plurality of tiles of the same size; the on-chip cache unit is used for storing of data of part of to-be-computed tiles and dependence data required for computing;

the transmitting unit is used for reading the data of the corresponding tiles from the on-chip cache unit according to a sequence specified by the scheduling algorithm and sending the data to the pre-recombination network;

the main computing array is used for completing computing of data of main tiles; the pre-recombination network is used for carrying out arbitrary data recombination on the data of the tiles before the data of the tiles is computed;

the post-recombination network is used for carrying out arbitrary data recombination on the data of the tiles after the data of the tiles is computed;

the data dependence controller is used for processing a data dependence relationship between the data of the tiles; and the global scheduler is used for executing a preset scheduling algorithm to control prefetching, transmitting, computing, data recombination and data dependence relationship processing of data of the tiles; according to the technical solution, the locality of memory access is improved by changing a data storage mode and a computing strategy of matrix operation, and meanwhile, data recombination is dynamically completed by adding a multifunctional data path, so that the influence of an irregular data structure and data rearrangement on the computing efficiency is reduced, the utilization rate of the on-chip cache and the computing unit is improved to the maximum extent, and the computing speed is improved.

According to the technical solution, the computing architecture can improve the data utilization rate and improve the data processing flexibility, so that the Cache Miss is reduced, and the memory bandwidth pressure is reduced. The beneficial effects brought by the technical solution are specifically reflected in the following three aspects.

Firstly, a large-scale matrix is divided into a plurality of tiles, and the tiles serve as minimum granularity data of matrix operation. The data of each tile is continuously stored in the memory, so that the utilization rate of the cache can be effectively improved. In addition, by constructing a corresponding algorithm, multiple reuse of the tiles can be realized, so that the utilization rate of the cache is further improved, and the performance bottleneck caused by the memory bandwidth is reduced.

Secondly, a plurality of tiles are allowed to complete flexible data recombination and exchange in a data path, so that data structure recombination can be performed according to computing requirements, and the computing requirements of a computing array and the format requirements of a storage unit can be met to the maximum extent. For example, the tile data can be arranged aiming at the deployment of the computing array, so that the efficiency of the computing array reaches the highest. In addition, by supporting data exchange and recombination among a plurality of tiles, arbitrary global row and column exchange in the matrix can be efficiently completed, the operation is completed in the data transmission process without consuming extra storage space and delay, and therefore the efficiency of random row and column exchange in the matrix is effectively improved. Theoretically, any global matrix recombination can be completed through a limited number of times of intra-tile and inter-tile data recombination. In this way, the expandability and adaptability of the computing system to irregular matrix operation are greatly improved.

Thirdly, optimized scheduling of computing is completed according to the tile dependence relationship in matrix operation, the high reuse rate of tile processing is achieved, the cache utilization rate is further improved, and the method can well adapt to an existing matrix algorithm. The high reuse rate is the key to improving the tile performance, and for a matrix algorithm of multiple iterations, the locality of data is generally weak because a global data dependence relationship generally exists between the iterations, so that repeated iterative use of local data is difficult to realize, which directly causes that on-chip and off-chip data transfer becomes a key bottleneck. According to the technical solution, the dependence relationship of tiles among different iterations can be analyzed, and the maximum reuse rate conforming to the dependence relationship is realized in a tile grouping manner, so that the matrix operation after tile grouping has good data locality.

DETAILED DESCRIPTION

Figure 1:
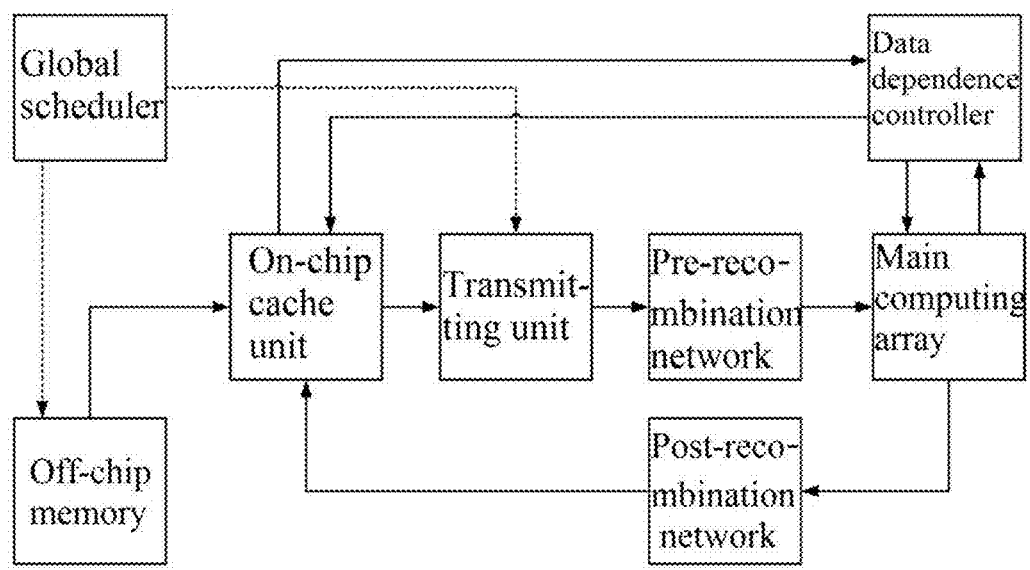
FIG. 1 is a structural schematic diagram of computing architecture provided in one embodiment of the disclosure.

In one embodiment, as shown in FIG. 1, the disclosure provides computing architecture, which comprises an off-chip memory, an on-chip cache unit, a transmitting unit, a pre-recombination network, a post-recombination network, a main computing array, a data dependence controller and a global scheduler, wherein, the off-chip memory is used for storing all large-scale data in the format of tiles, wherein the large-scale data is divided into a plurality of tiles of the same size;

the on-chip cache unit is used for storing of data of part of to-be-computed tiles and dependence data required for computing;

the transmitting unit is used for reading the data of the corresponding tiles from the on-chip cache unit according to a sequence specified by the scheduling algorithm and sending the data to the pre-recombination network;

the main computing array is used for completing computing of data of main tiles; the pre-recombination network is used for carrying out arbitrary data recombination on the data of the tiles before the data of the tiles is computed;

the post-recombination network is used for carrying out arbitrary data recombination on the data of the tiles after the data of the tiles is computed;

the data dependence controller is used for processing a data dependence relationship between the data of the tiles; and the global scheduler is used for executing a preset scheduling algorithm to control prefetching, transmitting, computing, data recombination and data dependence relationship processing of data of the tiles; according to the technical solution, the locality of memory access is improved by changing a data storage mode and a computing strategy of matrix operation, and meanwhile, data recombination is dynamically completed by adding a multifunctional data path, so that the influence of an irregular data structure and data rearrangement on the computing efficiency is reduced, the utilization rate of the on-chip cache and the computing unit is improved to the maximum extent, and the computing speed is improved.

Figure 2A:
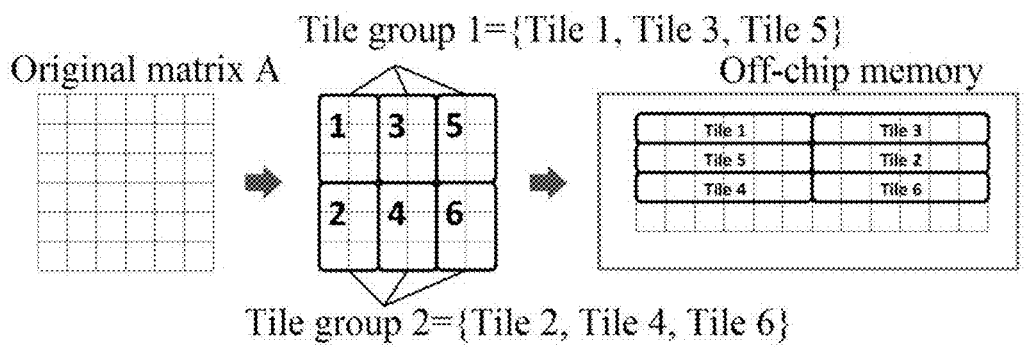
FIG. 2(a) to FIG. 2(c) are tile division and tile grouping of an original matrix in one embodiment of the disclosure, and a distribution diagram of data of each tile in an off-chip memory.
Figure 2B:
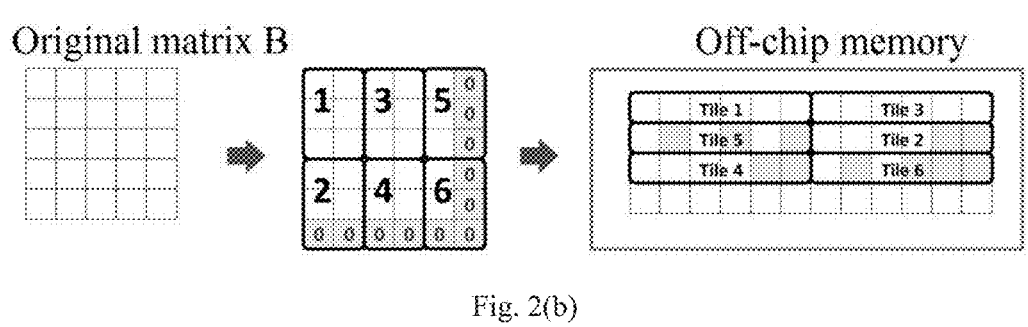
Figure 2C:
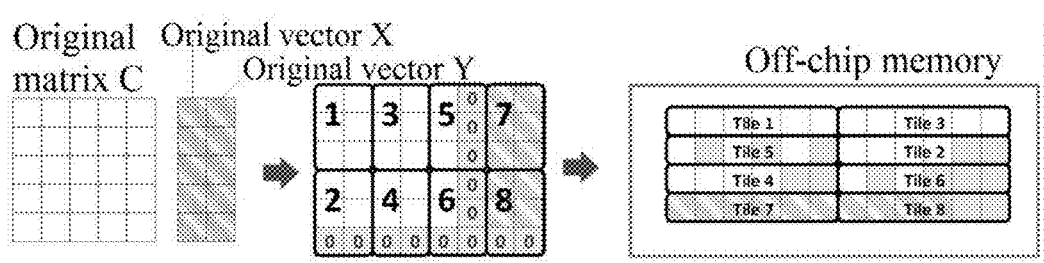

In the embodiment, the off-chip memory is used for storing all large-scale data in the format of tiles. An off-chip storage device is a large-capacity storage device, such as DDR, and this type of device has the characteristics that the access speed is relatively low, and the storage capacity is relatively large. According to the disclosure, all the data of the large-scale matrix are stored in the off-chip memory. The large-scale matrix is divided into a plurality of tiles of the same size in advance, and the tiles are stored in an off-chip memory. The tile is the minimum granularity data of matrix operation and is also the minimum unit of transmission, operation and control. Each tile is a local M*N sub-matrix of original data, and element data in each tile is continuously stored in the memory. Data of different tiles is generally continuously stored by taking a tile group as a unit, that is, a tile group consisting of a plurality of tiles is in a continuous storage address space. There may be a plurality of tile groups. The sizes of the tiles, namely the specific values of M and N, are determined according to specific problems and computing scales, and M=N can be adopted under some special conditions, namely each tile is a local square matrix. Original data which cannot be divided into M*N sub-tiles is enabled to meet the dividing method of the N*N sub-tiles in a mode of performing 0 expansion on edges of the data. FIG. 2(a) to FIG. 2(c) show tile division and tile grouping of the original matrix, and the distribution condition of data of each tile in the off-chip memory. In examples of FIG. 2(a), FIG. 2(b), and FIG. 2(c), M=3, N=2, and each tile is a submatrix of a size of 3*2. An original matrix is divided according to the size of 3*2, and if the size of the original matrix does not form an integral multiple of M*N, 0 is supplemented at the edge (as shown in FIG. 2(b)). It can be seen that all elements in each tile are continuously stored in the memory, and different tiles are continuously stored according to tile groups. In addition, for vectors needing operation with the matrix, the vectors are stored according to M*N tiles, and the vectors and the matrix tiles are managed in a unified mode. As shown in FIG. 2(c).

Although the disclosure is designed for large-scale matrix operation, matrixes of any size can be processed under the condition that computing resources and storage resources are sufficient. The values of the sizes M and N of the tiles need to be matched with the scale of a computing array, the reasonable values of M and N should be between 4 and 32 according to the scale of a current mainstream computing architecture and the scale of a memory device, and the dimension of a processed matrix can be between 4 and 50000.

It needs to be noted that the tile refers to a sub-matrix at a specific position in the matrix, and the tile is a concept relative to the matrix. A matrix is divided into a plurality of tiles, namely a sub-matrix area range corresponding to each tile is determined. The data of the tiles refer to all elements in sub-matrix areas contained in one tile. Therefore, the entity participating in the operation is tile data instead of a tile, and after the tile data is computed, the value of the data may be changed, so that in the matrix computing, the tile data is continuously updated, while the tile (as the range of a sub-matrix) is constant.

The on-chip cache unit is an embedded on-chip storage device and provides a high read-write access speed, but the storage capacity is low. The on-chip cache is used for storing part of the to-be-computed tiles and dependence data required for computing. Wherein part of the to-be-computed tiles refer to complete data of a plurality of tiles. If the on-chip cache unit is large enough, tiles of all the original matrixes can be stored, and if the on-chip cache unit is not large enough, the stored tiles are only a part of a plurality of tiles divided by the matrix to be computed. The tiles are read to the on-chip cache unit from the off-chip memory unit and then computed, and then are written back to the off-chip memory unit. The data on which computing depends refers to other information and numerical values, except for tile elements, required by the tiles in the on-chip memory unit during computing. Detailed interpretation about dependence data will be given later.

The transmitting unit is used for reading the data of the corresponding tiles from the on-chip cache unit according to the sequence specified by the global scheduler module and sending the data to the pre-recombination network. The transmitting unit can read data of a plurality of tiles from the on-chip cache unit each time, and the number of the tiles is generally 2-4. The transmitting unit is also used for adding a corresponding tag bit to each tile when transmitting the tile. The tag bits follow the tile data packet to flow through all subsequent processing flows. By means of the tag bit, the transmitting unit can accurately control the behavior of the transmitted tile in the whole computing process. Detailed interpretation about the tag bit will be given later.

Figure 3:
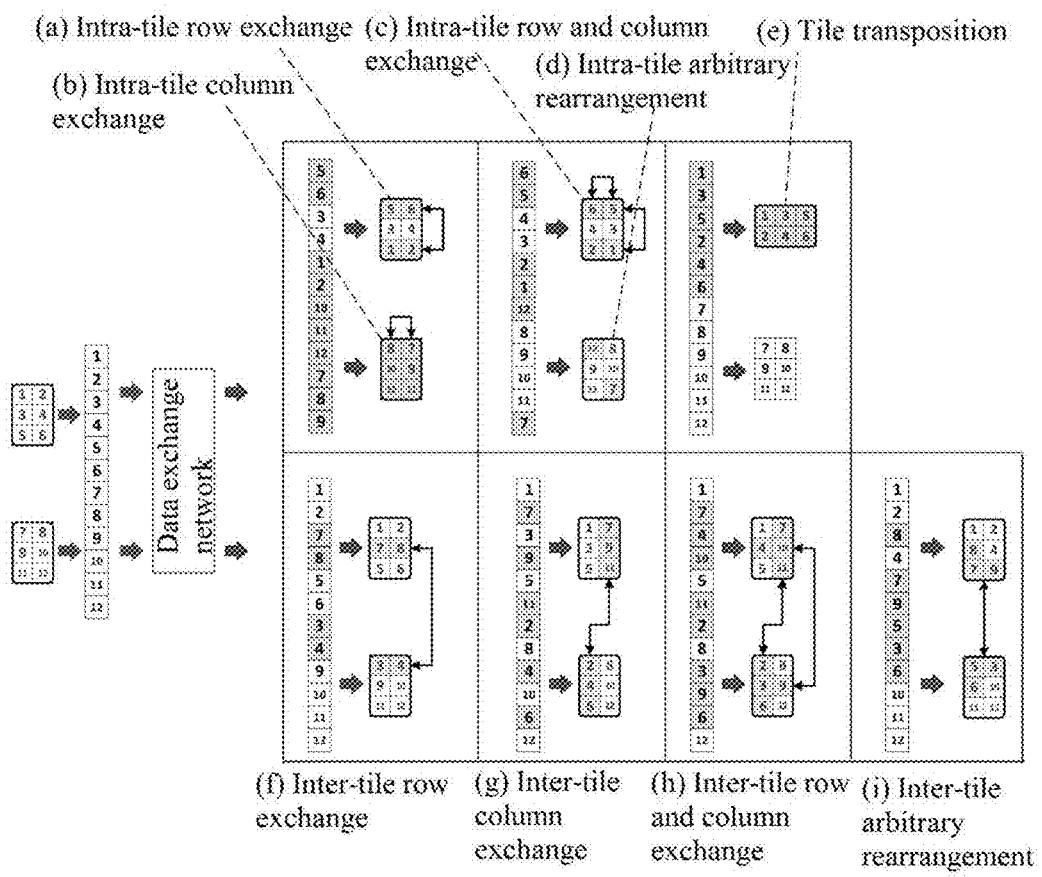
FIG. 3 is a diagram of change generated after a plurality of tiles pass through a pre-recombination network in one embodiment of the disclosure.

The pre-recombination network is a non-blocking data exchange network with the data width of k*N*N, and the network is used for processing k tiles sent by the transmitting unit and is responsible for carrying out data recombination on data of the tiles before the tiles enter the main computing array. Data recombination can occur in a single tile and can occur among a plurality of tiles, and the form can be arbitrary row exchange, column exchange, data rearrangement according to arbitrary sequence, data multicast and the like. FIG. 3 illustrates several kinds of changes generated after a plurality of tiles pass through a pre-recombination network. As shown in FIG. 3, network input data is a set of single or multiple tile elements, and the elements are expanded according to a one-dimensional vector and sent into a pre-recombination network. The pre-recombination network outputs a one-dimensional vector with the same length as the input, and the vector is an element of each output tile. Data recombination can be completed among the elements of the tiles, and the elements of a plurality of tiles can be exchanged and rearranged. The operations that the network can complete on the input data are not limited to examples listed in FIG. 3. The pre-recombination network can be realized by selecting different data exchange networks according to specific recombination requirements. In the embodiment of the invention, a BENES network is adopted as a pre-exchange network, and the structure and the specific introduction of the BENES network are shown below.

Figure 4:
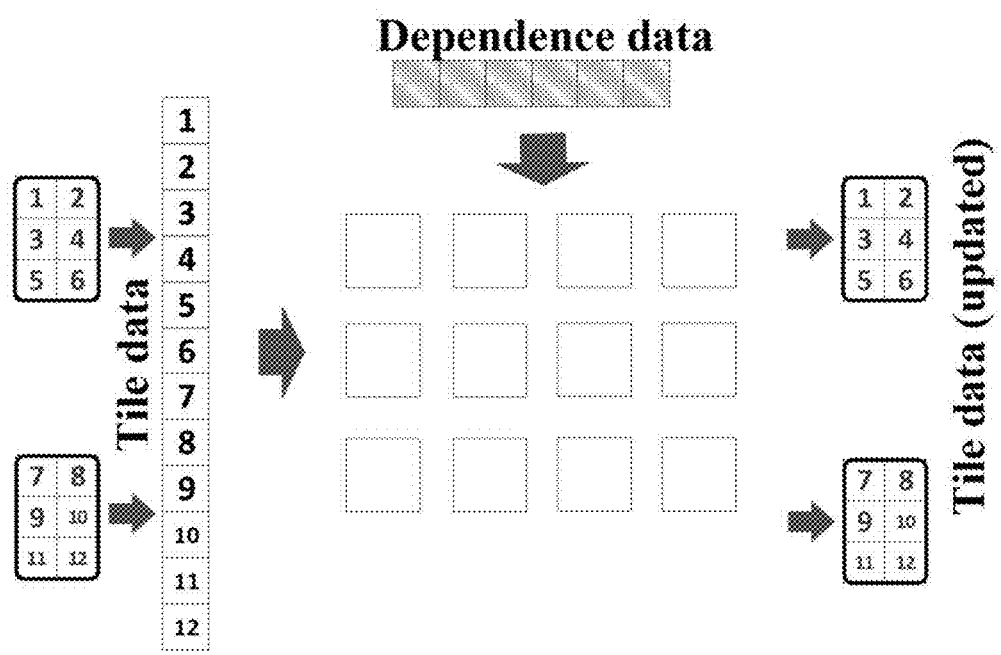
FIG. 4 is an operand input and result output diagram of a main computing array in one embodiment of the invention.

The main computing array is used for completing the computing of the data of the main tile and generating a computing result. The main computing array comprises parallel computing arrays and can compute the input tile data in parallel. Generally, in addition to the input tile data, the operands of the computing array also comprise dependence data required for computing. Detailed interpretation about dependence data will be given later. After the main computing array carries out operation on the input tiles, values of corresponding elements of the tiles can be updated by using computing results, and other computing results can be generated for some algorithms. Therefore, the data finally output by the main computing array comprises the updated tile data. Examples in FIG. 4 represent operand input and result output of the main computing array, and it should be noted that FIG. 4 is only one possible scale and computing mode of the main computing array.

The post-recombination network is used for carrying out arbitrary data recombination on a computing result, namely updated tile data, generated by the main computing array after the data of the tile is computed; the recombination function of the post-recombination network is similar to that of the pre-recombination network.

Figure 5A:
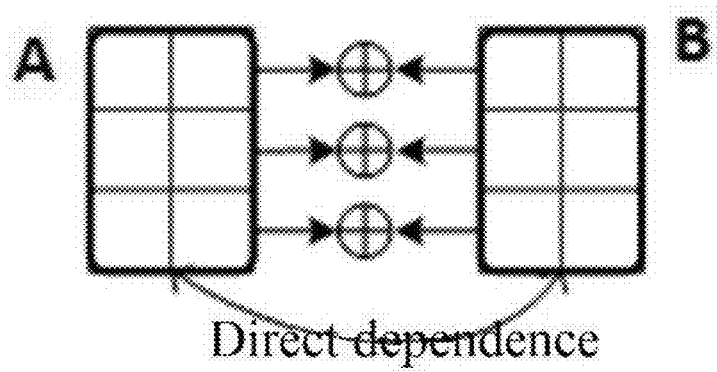
FIG. 5(a) to FIG. 5(d) are example diagrams of generating data dependence in one embodiment of the disclosure.
Figure 5B:
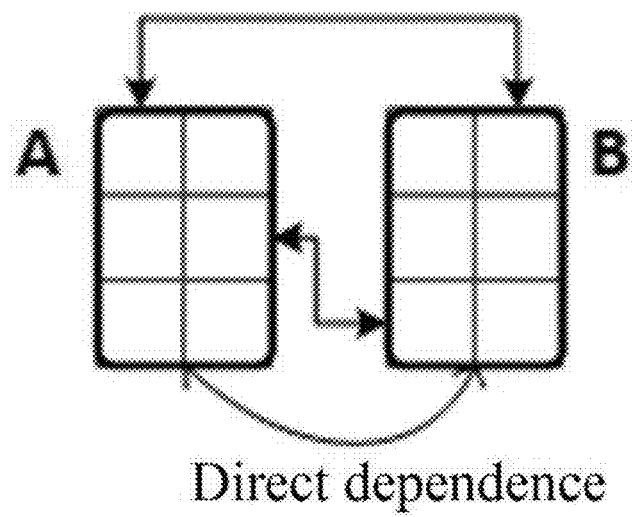
Figure 5C:
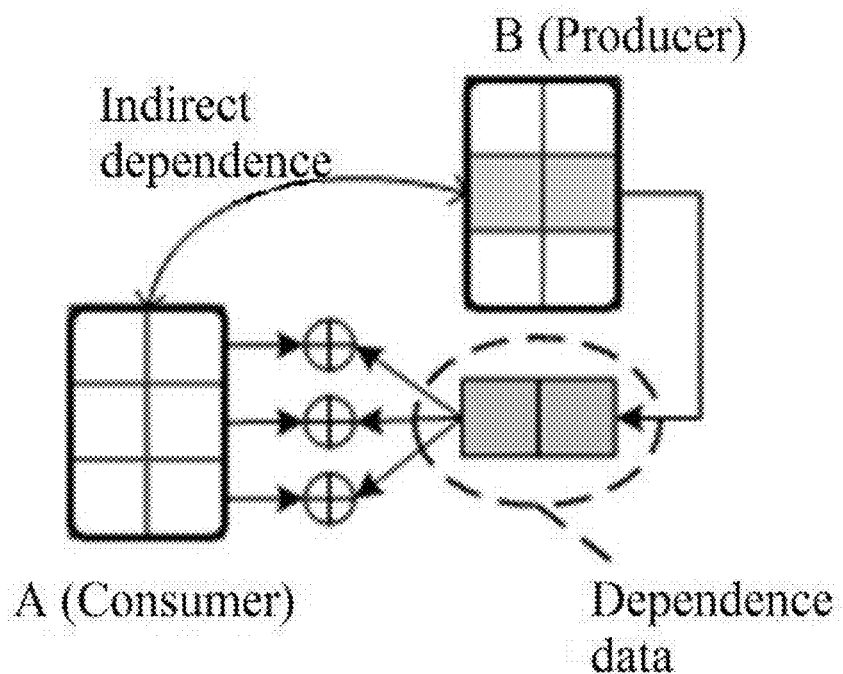
Figure 5D:
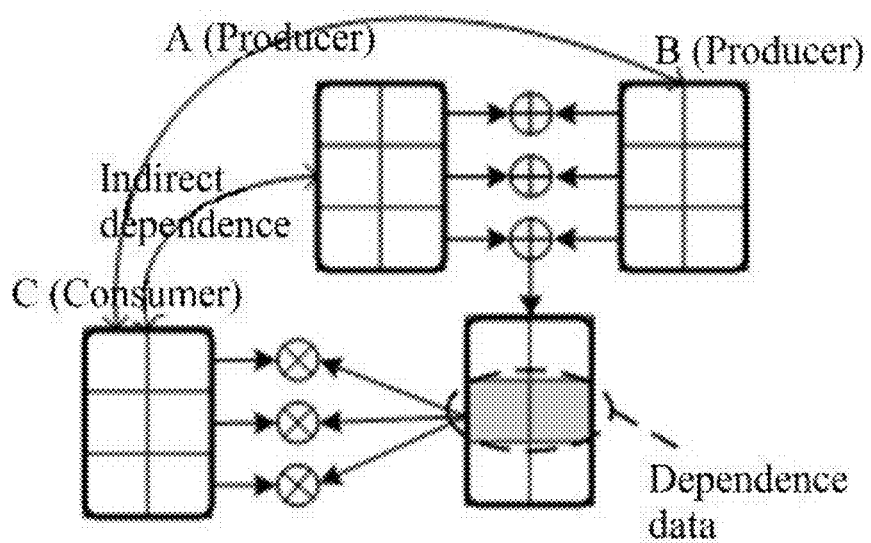

The data dependence controller is used for processing a data dependence relationship between the data of the tiles. The data dependence relationship is generated by operation and operation required by the tiles. In many cases, operation required by a tile cannot be completed only by means of elements of the tile, but other information and numerical values are required, and additional elements except the elements of the tile are dependence data of the operation of the tile. The dependence data can be values of all elements or partial elements of other tiles, or intermediate values computed from elements of other tiles. The existence of the dependence data means that a dependence relationship exists between different tiles. The dependence relationship is divided into direct dependence and indirect dependence. If a certain operation needs all elements of a plurality of tiles to participate at the same time, the tiles directly depend on one another because all elements must directly participate in the operation. Correspondingly, if the dependence data of a certain tile is part of elements of other one or more tiles or intermediate computing results derived from the tiles, the dependence relationship is indirect dependence. In the indirect dependence relationship, the tile generating the dependence data is a "producer tile", and the tile using the dependence data is a "consumer tile". Several examples which can generate data dependence are listed from FIG. 5(a) to FIG. 5(d): in FIG. 5(a), a tile A and a tile B are subjected to additive operation, and the tile A and the tile B form a direct dependence relationship; in FIG. 5(b), the tile A and the tile B need to be subjected to arbitrary row exchange, and the tile A and the tile B form a direct dependence relationship; in FIG. 5(c), each row of the tile A needs to subtract a certain row of elements of the tile B, and the tile A and the tile B form an indirect dependence relationship, wherein B is a "producer tile", and A is a "consumer tile"; in FIG. 5(d), the tile C is multiplied by a certain row of elements after the tile A and the tile B are added, the tile A and the tile B/C form an indirect dependence relationship, the tile B/C is a "producer tile", and the tile A is a "consumer tile".

Figure 6:
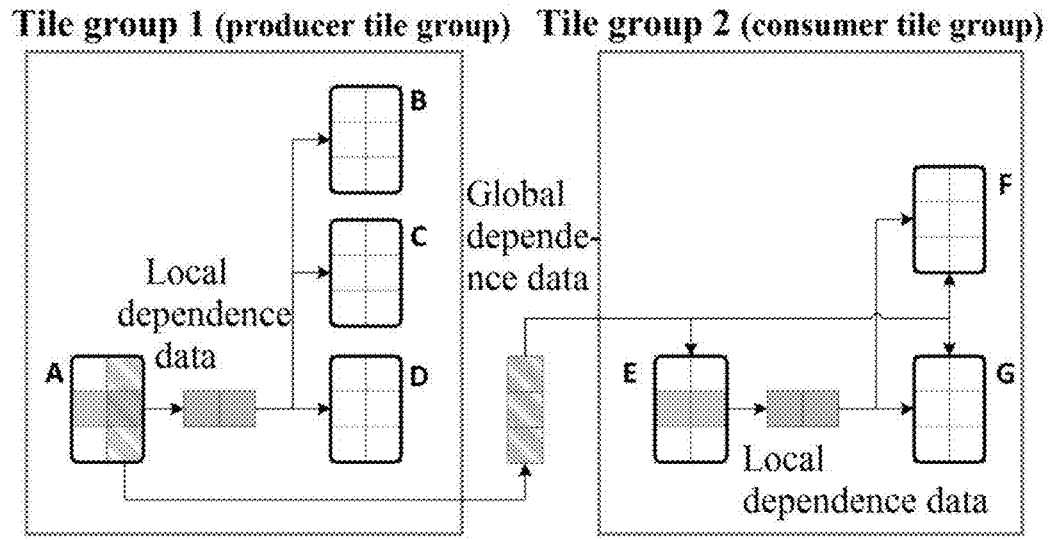
FIG. 6 is a diagram of a dependence relationship between tile groups in one embodiment of the disclosure.

Based on the dependence relationship of the tiles, tile groups and the dependence relationship among a plurality of tile groups can be further defined. The tile group is a set of a plurality of tiles. A dependence relationship may exist among a plurality of tiles in the same group, and dependence data among different tiles in the same group is called "local dependence data". In addition, some tiles in one tile group may form a dependence relationship with some tiles in another tile group, and the dependence data crossing the tile group is called "global dependence data". The tile group that generates the "global dependence data" is referred to as a "producer tile group", and the tile group that uses the "global dependence data" is referred to as a "consumer tile group". Therefore, a dependence relationship among the tile groups is formed. FIG. 6 shows an example in which tiles A, B, C, D are divided into a tile group 1, and tiles E, F, G are divided into a tile group 2. In the tile group 1, A is a producer tile, B, C and D are consumer tiles, and dependence data between A and B, C, D is local dependence data of the tile group 1. Similarly, local dependence data is generated by the E tile in the tile group 2. In addition, the tile A also generates dependence data required by the tile group 2, and the data crosses the tile group, so that the data is global dependence data. The global dependence data is generated by the tile group 1, so that a dependence relationship is formed between the tile group 2 and the tile group 1. Wherein the tile group 1 is a "producer tile group", and the tile group 2 is a "consumer tile group".

Extraction, computing and management of the dependence data in the disclosure are all completed by a data dependence manager module. For the specific description of the tile dependence relationship, please refer to the description of the embodiments below.

The global scheduler is a core control module of the architecture and is used for executing a preset scheduling algorithm to control prefetching, transmitting, computing, data recombination and data dependence relationship processing of the data of the tiles. Specifically, the global scheduler instructs a transmitting module to read and transmit the tiles in the on-chip cache according to a certain scheduling sequence, and different tag bits are set for different tiles according to the instruction of the global scheduler. The tag bit of each tile indicates the required processing and operation at subsequent modules such as a pre-exchange network, a main computing array, a post-exchange network, and a data dependence controller. The global scheduler determines the transmitting sequence of the tiles and the operation required to be completed by the tiles based on the dependence relationship between the tiles and the dependence relationship between the tile groups. Simply speaking, the scheduling principle is that the producer tiles are prior to the consumer tiles, and the producer tile group is prior to the consumer tile group. For example, in an example shown in FIG. 6, one possible scheduling sequence is A→B→C→D→E→F→G. The global scheduler can be realized in various forms, including a state machine, a dynamic look-up table, an MCU processor and the like. In addition, the global scheduler is also responsible for notifying a prefetching module of tile transfer between the off-chip memory unit and the on-chip memory unit in advance according to the processing sequence of the tiles.

According to the embodiment, in the whole computing process, the global scheduler is responsible for prefetching, computing, data recombination and dependence relationship processing of the tiles according to the preset scheduling algorithm. The global scheduler reads the data tiles into the on-chip cache in a prefetching mode, performs computing by taking the tiles as units, and in this embodiment, the size of the tiles is M=N=8.

The transmitting module is responsible for reading the corresponding data tiles from the on-chip cache according to the sequence specified by the global scheduler and sending the data tiles to a subsequent processing flow. The transmitting module reads and sends k tiles (k>1) each time. The K tiles can pass through all operation processing flows in parallel.

In the computing process of the tile, a tile exchange network is adopted to recombine the data structure, and in this embodiment, both the pre-recombination network and the post-recombination network are non-blocking data exchange BENES exchange networks with the data width of k*N*N. The two networks can carry out arbitrary data recombination on k tiles before and after computing.

The main computing array is a group of parallel fixed-point/floating-point computing units, and the operation types are common fixed-point/floating-point operation. In this embodiment, the main computing array is in a pipelined design, k*N*N elements can be input in each period, and add, multiply or multiply accumulate (mac) operation can be completed.

The data dependence module is responsible for processing possible data dependence relationships among different tiles. The data dependence module is used for managing dependence data, and can invoke an auxiliary computing array to compute the dependence data. The auxiliary computing array is a group of parallel fixed-point/floating-point operation units, and the array scale and the operation type of the auxiliary computing array depend on a specific matrix algorithm.

In this embodiment, the tile data is continuously distributed in the storage space and is uniformly prefetched and managed by the global scheduler, so that the utilization rate of the on-chip cache is very high. The tile grouping and scheduling algorithm based on the dependence relationship and the management module for dependence data adopted in this embodiment can reduce the coupling between the tiles to the maximum extent, improve the reuse rate of the tiles, reduce the access pressure on the off-chip storage device, greatly reduce the performance bottleneck caused by memory access delay, and furthermore provide high-performance and low-delay matrix computing.

Figure 7:
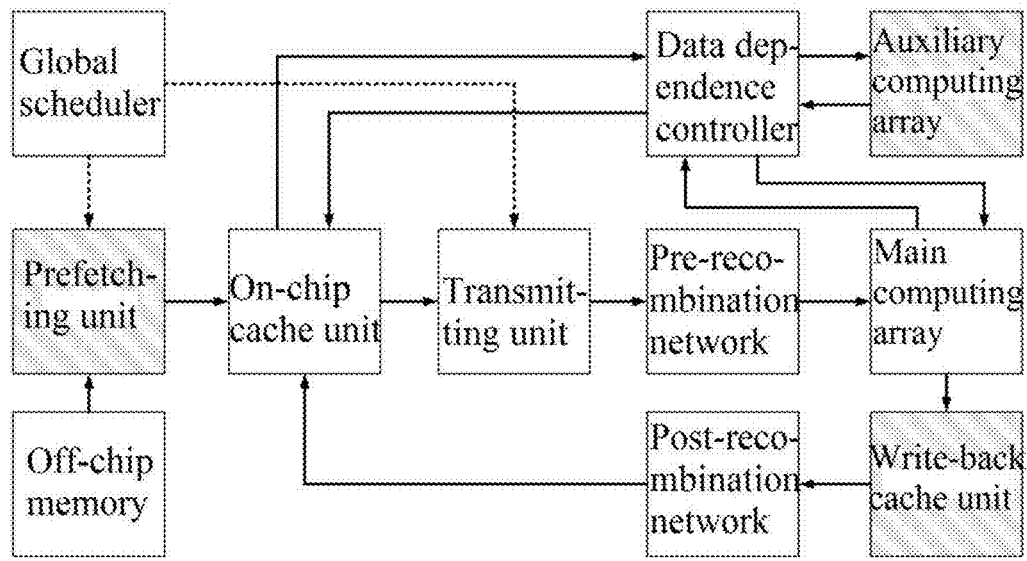
FIG. 7 is a structural schematic diagram of another computing architecture provided in one embodiment of the disclosure.

In another embodiment, as shown in FIG. 7, the disclosed computing architecture also comprises:

a prefetching unit, used for completing transfer of data of tiles between the off-chip memory and the on-chip cache;

a write-back cache unit, used for writing the data of the tiles back to the on-chip cache unit after the data of the tiles is computed; and an auxiliary computing array, used for assisting the data dependence controller in extraction, pre-processing and computing of the dependence data.

According to the embodiment, the prefetching unit is used for completing the transfer of the data of the tiles between the off-chip memory and the on-chip cache according to the sequence specified by the global scheduler module. The prefetching module carries out simple data transfer between two storage devices, and the address and length of the data to be transferred are specified by the global scheduler module. The functions of the prefetching module can be realized by the existing data transfer technology at present.

The auxiliary computing array is used for assisting the data dependence controller in extraction, pre-processing and computing of the dependence data. It needs to be noted that the operation units and the operation scale of the auxiliary computing array depend on different computing algorithms and are not necessary components. In some matrix computing, an auxiliary computing array does not need to participate in extraction and computing of dependence data. Generally, the scale of the auxiliary computing array is smaller than that of the main computing array.

In another embodiment, the data of the tiles is continuously stored in the memory.

According to the embodiment, the data of each tile is continuously stored in the memory, so that the utilization rate of the cache can be effectively improved. Each element of each tile is always stored on continuous addresses, and data of different tiles are generally continuously stored by taking a tile group as a unit, namely a tile group consisting of a plurality of tiles is in a continuous storage address space. There may be a plurality of tile groups.

In another embodiment, the transmitting unit is also used for adding a corresponding tag bit to each tile when transmitting the tile.

Figure 8:
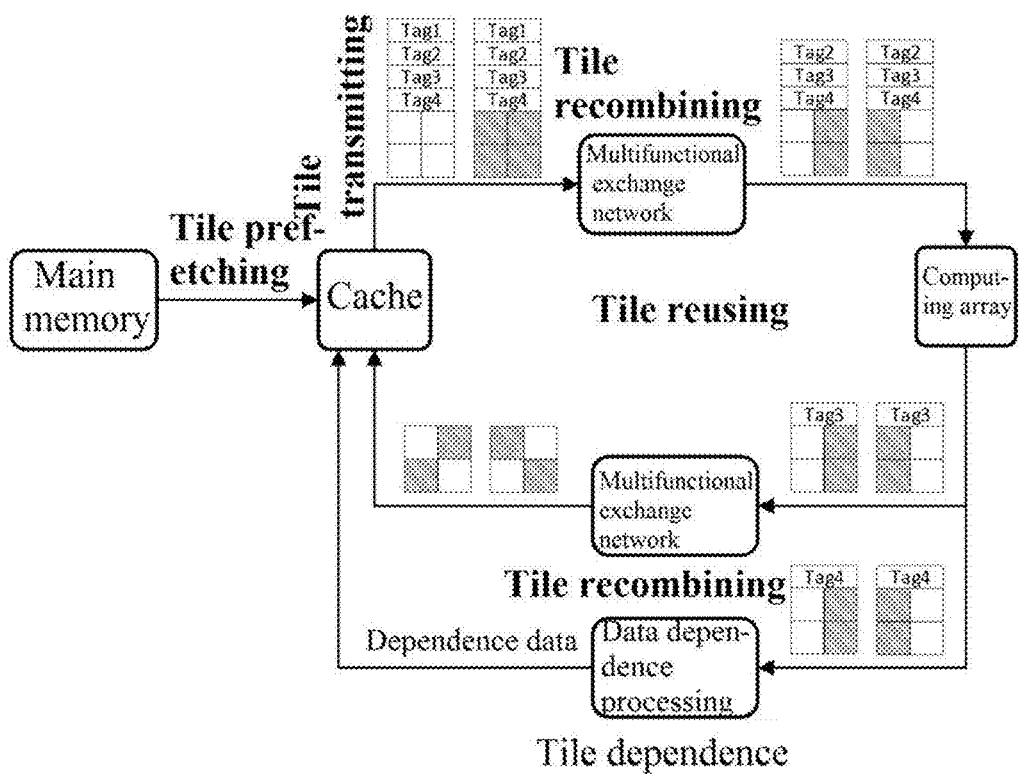
FIG. 8 is a flow schematic diagram of the overall computing flow of the tile in one embodiment of the disclosure.

In the embodiment, these tag bits follow the tile data packet to flow through all subsequent processing flows. By means of the tag bit, the transmitting unit can accurately control the behavior of the transmitted tile in the whole computing process. As a whole, the processing flow of the tiles is shown in FIG. 8. It can be seen from FIG. 8 that the tiles carry different types of tag bits during transmission, and these tag bits indicate the processing modes of the tiles in different modules and are abandoned immediately after specific operation is completed.

In another embodiment, the tag bit indicates a computing task required to be performed by a tile, data dependence information, and tile data recombination information.

According to the embodiment, the tag bit is specifically set as shown in the following Table 1.

TABLE 1

| Tag category | Tag content | Used module | Tiles involved |
|---|---|---|---|
| Tile computing information | Marking a computing task required to be performed by the tile | Main computing array | Tile itself |
| Tile dependence information | 1. Marking dependence data required for tile computing 2. Marking dependence data which may be generated by the tile and needs to be stored, and a computing/acquisition mode of the dependence information. | Data dependence controller Auxiliary computing array | Tile itself |
| Tile data recombination information | 1. Marking data recombination requirements inside the tile 2. Marking data recombination requirements among a pluralityoftiles transmitted in parallel in a current path | Pre-recombination network Post-recombination network | Multiple tiles transmitted in parallel |

For example, in the computing process shown in FIG. 8, one possible configuration mode of the tag bits Tag1-4 involved in the computing process is shown in the following table. It needs to be noted that Table 2 is only one case for setting the tag bit, and the specific tag bit content and the setting method thereof need to be determined according to an actual computing task.

TABLE 2

| Tag | Content | Data type | Example |
|---|---|---|---|
| 1 | Pre-recombination operation (OP ID) | Int8 | Intra-tile row exchange |
|  | Parametersfor pre-recombination operations | Int32, Int32 | Row ID requiring exchange |
| 2 | Required dependence data (DATA ID) | Int32 | Index of required dependence data |
|  | Computing type (OP ID) | Int8 | MAC |
| 3 | Extracting dependence data operations (OP ID) | Int8 | Extracting a maximum element for a certain row |
|  | Extracting data dependence parameters | Int32, Int32 | Number of rows to be extracted |
| 4 | Post-recombination operation (OP ID) | Int8 | Inter-tile column exchange |
|  | Parametersfor post-recombination operations | Int32, Int32 | Column ID requiring exchange |

In another embodiment, the data dependence relationship comprises direct dependence and indirect dependence; the direct dependence means that a plurality of tiles need to directly participate in operation, and the obtained operation result is directly used for updating the tiles or serves as intermediate dependence data; the indirect dependence means that computing of a certain tile needs to be completed by means of data of other tiles.

According to the embodiment, for a matrix algorithm needing multiple iterative computations, the tile scheduling algorithm aims at analyzing the dependence relationship between different tiles and optimizing the reuse efficiency of the tiles. Specifically, the scheduling sequence and the scheduling strategy of the tiles depend on the dependence relationship between the tiles.

The indirect dependence means that computing of a certain tile needs to be completed by means of data information of other tiles, in the dependence relationship, the used tile is called a leading tile, and the used data information is called dependence data. Dependence data, as intermediate data for operation, can be stored in an on-chip cache and read during computing of related tiles.

The direct dependence means that a plurality of tiles need to directly participate in operation, and the obtained operation result is directly used for updating the tiles or used as intermediate dependence data. In this case, the tiles involved constitute a direct dependence relationship with each other. For example, for data exchange among a plurality of tiles, the tiles will form a direct dependence relationship. For example, when the maximum value of a certain column of elements of the matrix is searched, the tiles to which the column of elements belong form direct dependence.

Figure 9:
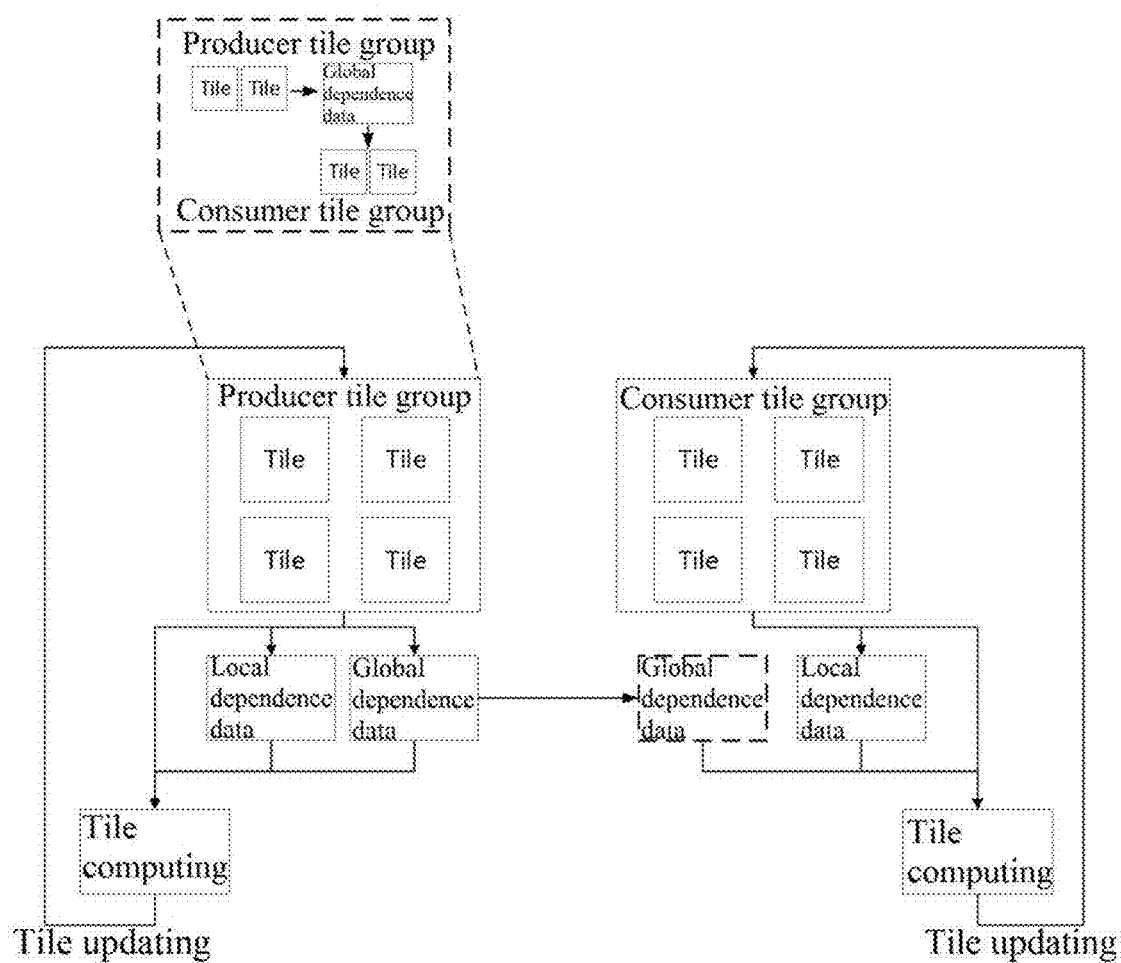
FIG. 9 is a schematic diagram of a producer tile group and a consumer tile group divided according to a tile dependence relationship in one embodiment of the disclosure.

Based on the two types of basic dependence relationship, for a given matrix algorithm, the dependence relationship of all tiles can be analyzed and established. All tiles can be recursively grouped into "producer tile groups" and "consumer tile groups" based on the "producer-consumer" model and indirect dependence relationship between the tiles. The former generates dependence data in the computing process, and the latter uses the dependence data in the computing process. As shown in FIG. 9, in the model, the tiles are divided into a "producer tile group" and a "consumer tile group". The "producer tile group" provides dependence data required for computing for the "consumer tile group". All the indirect dependence relationships can generate corresponding dependence data, and the data needs to be shared to the consumer tile group so as to complete the computing of the consumer tiles. The producer tile group can generate two types of dependence data in the operation process: one type is "local dependence data" which is only used for tile operation in the group and is not shared with other tile groups; and the other type is "global dependence data", and this type of data is not only used for computing of tiles in the group, but also needs to be provided to the corresponding "consumer tile group" for use. In addition, a multi-level "producer-consumer" dependence relationship can be seen. That is, a more underlying "producer-consumer" dependence relationship still exists among the tiles in some producer/consumer tile groups. It needs to be noted that for a multi-level "producer-consumer" relationship, "global dependence data" of a lower layer can be "local dependence data" of an upper layer. According to the method, the producer tile and the consumer tile can be effectively decoupled by caching the "global dependence data" generated by the "producer" tile group and subsequently supplying the global dependence data to the "consumer" tile group, the producer tile and the consumer tile do not need to be repeatedly loaded for multiple times in the iteration process of matrix computing, and the reuse rate of the tile in the on-chip cache can be greatly improved. Specifically, a producer tile can complete multiple compute iterations continuously on a chip, and store corresponding global cache data. The subsequently loaded consumer tiles can also be continuously iterated for multiple times on the chip.

In addition, it needs to be noted that in different iteration stages of matrix operation, division of tile groups may change dynamically. Based on the model, the tile scheduling algorithm is carried out based on the following principles: (1) starting from a "producer-consumer" dependence relationship at the bottommost layer, preferentially selecting and transmitting tiles in a producer tile group; (2) continuously transmitting all the tiles with the direct dependence relationship; (3) repeatedly transmitting and computing the existing tiles in the on-chip cache until the dependence condition is not satisfied any more; and (4) prejudging a tile group required subsequently, and prefetching the tile group into the on-chip cache in advance.

In the specific implementation process, according to the actual situation of a matrix algorithm, the dependence relationship among the tiles needs to be analyzed, a "producer tile group" and a "consumer tile group" are established, the transmitting sequence and the scheduling strategy of the tiles are determined, and the scheduling strategy of the global scheduler is set according to the transmitting sequence and the scheduling strategy.

The global scheduler is set as a state machine for controlling tile prefetching, transmission and computing at each moment and deciding operations related to data dependence that need to be executed. These behaviors are completed through control interfaces between the global scheduler and the prefetching module, the transmitting module and the data dependence controller module.

In another embodiment, the data dependence controller is further used for (1) judging whether a current tile contains dependence data to which a subsequent tile depends or not, if yes, extracting, calculating and storing the dependence data, wherein the computing of the dependence data is completed by means of the auxiliary computing array; and 2) judging whether operation of the current tile depends on the previously stored tile data, if so, reading the related dependence data, and providing the dependence data to the main computing array to perform the operation of the current tile.

In the embodiment, the data dependence controller has the following specific functions: (1) managing storage, reading and emptying of all global dependence data and local dependence data; (2) for each currently transmitted tile, if the computing of the tile needs dependence data, the data dependence controller reads the corresponding dependence data from the on-chip cache and sends the dependence data to the main computing array; (3) for each currently transmitted tile, if the tile needs to generate dependence data, the data dependence controller is responsible for caching the corresponding tile data and extracting the required dependence data. Extraction of dependence data can be accomplished by means of an auxiliary computing array.

Figure 10:
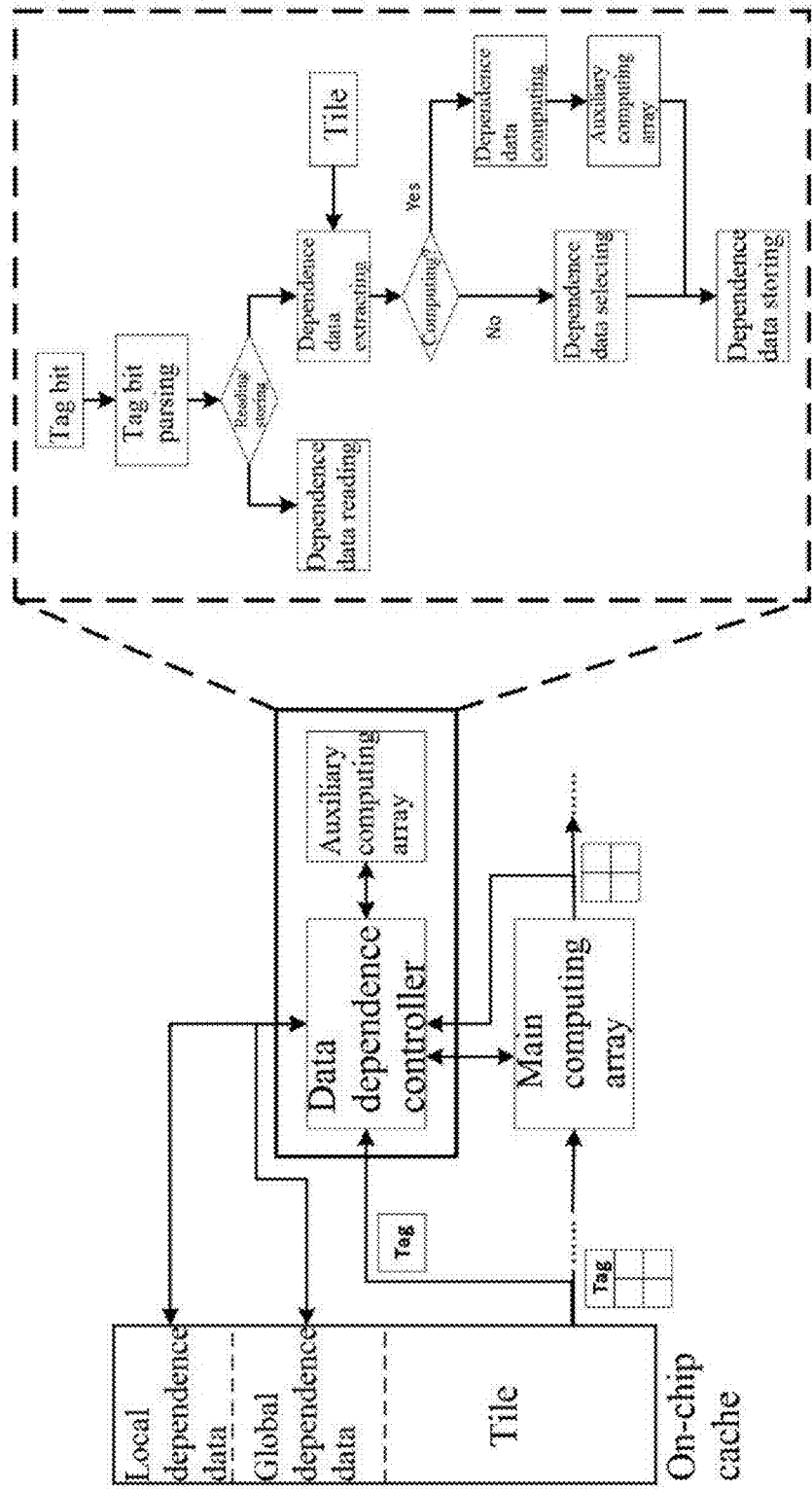
FIG. 10 is a workflow schematic diagram of a data dependence controller in one embodiment of the invention.

The workflow of the data dependence controller is shown in FIG. 10. After the tag bit carried by the transmitted tile is received, the data dependence controller firstly judges: (1) whether the tile corresponding to the tag needs to complete computing by dependence data or not; (2) whether the tile can generate dependence data needing to be stored or not. It should be noted that the above two operations may exist at the same time. Therefore, two sets of parallel logics for respectively processing data reading and data storage are realized in the data dependence controller. For data reading, the controller calculates a reading address of the dependence data, reads the reading address from the on-chip cache, and sends the reading address to the main computer array for computing. For data storage, the controller needs to further judge whether the dependence data can be directly obtained from the current tile data, such as the value of a certain row/column or a certain element in the tile. If so, the dependence data is directly selected from the tile, and stored in the on-chip cache. If not, the dependence data needs to be obtained by further computing the tile data. In this case, the controller invokes the auxiliary computing array to complete corresponding computing and stores a computing result in an on-chip cache.

In another embodiment, the dependence data comprises local dependence data and global dependence data; the local dependence data refers to intermediate data which is generated by a certain tile group and only needs to be used in the operation of the tile group; the global dependence data refers to intermediate data which is generated by a certain tile group and needs to be used in the operation of both the tile group and other tile groups.

In the embodiment, an indirect dependence relationship may exist between the tiles. In order to decouple the dependence relationship between tiles, improve the reuse rate of the tiles and reduce data transfer between an on-chip cache and an off-chip main memory, "dependence data" generated by "producer" tile groups needs to be cached when the "producer" tile groups are processed, and the dependence data can be subsequently used by "consumer" tile groups for computing. All the dependence data needs to be managed by a data dependence controller module.

The local dependence data does not need to be shared to other tile groups. Therefore, the local dependence data is stored only in the computing stage of the corresponding tile group and is abandoned after computing is completed.

The global dependence data refers to intermediate data which is generated by a certain tile group and needs to be used in the operation of the tile group and other tile groups (namely the corresponding "consumer tile groups"). The global dependence data needs to be stored in an on-chip cache for a long time, and can only be abandoned after all related dependence tiles are computed.

The data dependence controller cooperates with the global scheduler to manage the two types of dependence data. Specifically, the global scheduler determines a data dependence relationship between tiles, and indicates a data dependence operation required to be completed by the tile through a tag bit (Tag) when the corresponding tile is transmitted. After the data dependence controller receives the tag bit carried by the tile, the data dependence controller completes operation on the dependence data according to the indication of the tag bit. A flow example of the process is shown in FIG. 10.

In another embodiment, the pre-recombination network and the post-recombination network are data exchange networks. The network can be a BENES network, and can also be other networks with a data exchange function, such as a Batcher-Banyan network.

In the embodiment, two tile exchange networks, namely the pre-data recombination network and the post-data recombination network, are deployed on the whole computing path, and are respectively deployed in front of and behind the main computing array. The two networks are responsible for completing complex data recombination tasks in each tile or among a plurality of tiles, including row exchange, column exchange, transposition and other necessary data rearrangement. The data recombination network is realized by adopting a BENES network with k*N*N input.

Figure 11:
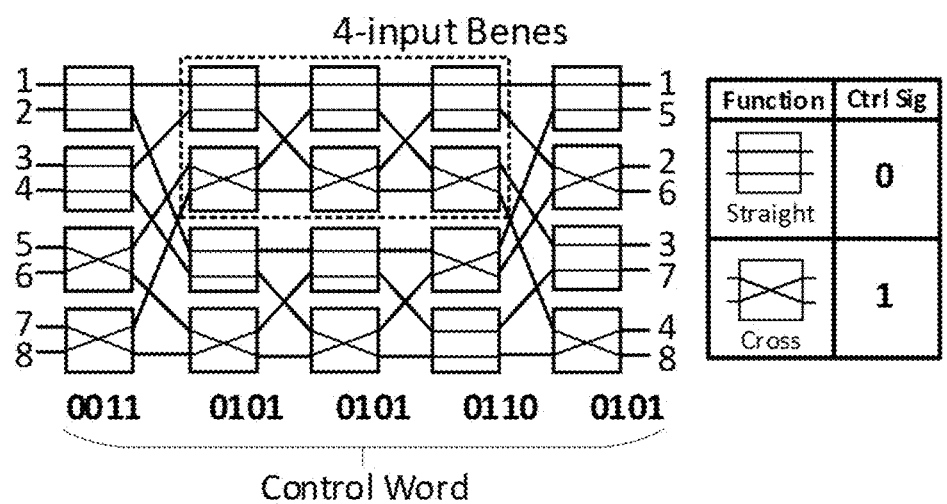
FIG. 11 is a structural schematic diagram of a BENES data exchange network in one embodiment of the disclosure.

The schematic diagram of the BENES network is as shown in FIG. 11. The BENES network is composed of a plurality of levels of exchange units, and each exchange unit can complete straight-through or exchange of two input signals. By applying a control signal to the BENES network, arbitrary data rearrangement from the input port to the output port can be realized. The control signals are referred to as "control words". It should be noted that, because the BENES network is constructed recursively, one N-input BENES network can be used as two independent N/2-input BENES networks. As shown in FIG. 11, one 8-input BENES can be used as two independence 4-input BENES networks. The BENES network with k*N*N input not only can complete arbitrary data recombination among k tiles, but also can complete data recombination only for one or more networks.

Figure 12:
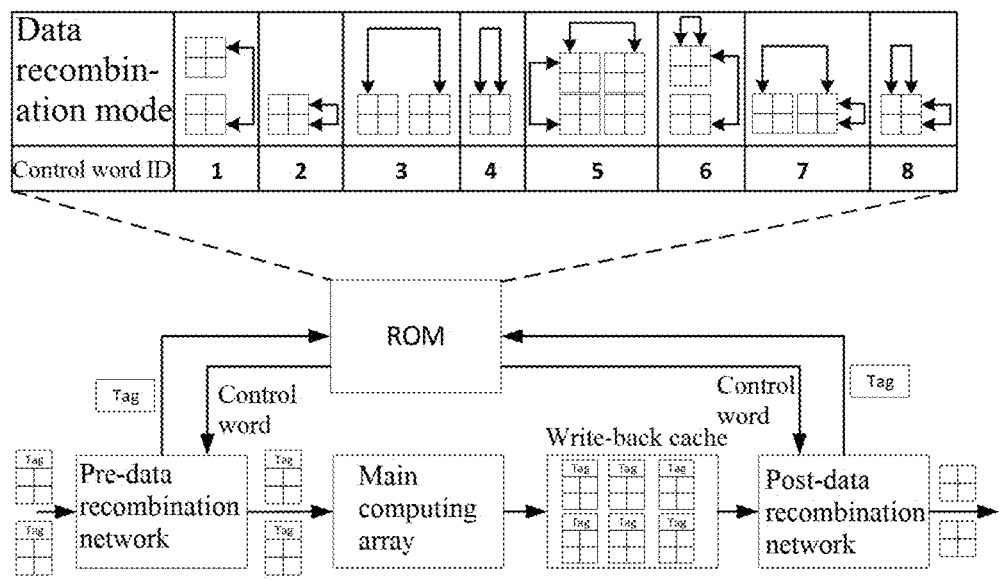
FIG. 12 is a workflow example diagram of a data recombination network module in one embodiment of the disclosure.

In actual use, all needed data rearrangement operations need to be determined in advance, and control words of the data rearrangement operations need to be computed in advance. These control words are stored in an on-chip ROM and can be read by a pre-data recombination network and a post-data recombination network. Control word IDs corresponding to the pre-rearrangement operation and the post-rearrangement operation required by the tile are respectively recorded in tag bits of the tile. The data recombination of the tiles can be completed only in a single tile, and can also be completed among a plurality of tiles transmitted in parallel (at most k). For complex data recombination which needs to be completed by a plurality of tiles together, the involved tiles need to be cached in a write-back cache module firstly, and then are processed by a post-data recombination network according to a specified sequence. An example is given in FIG. 12.

Figure 13:
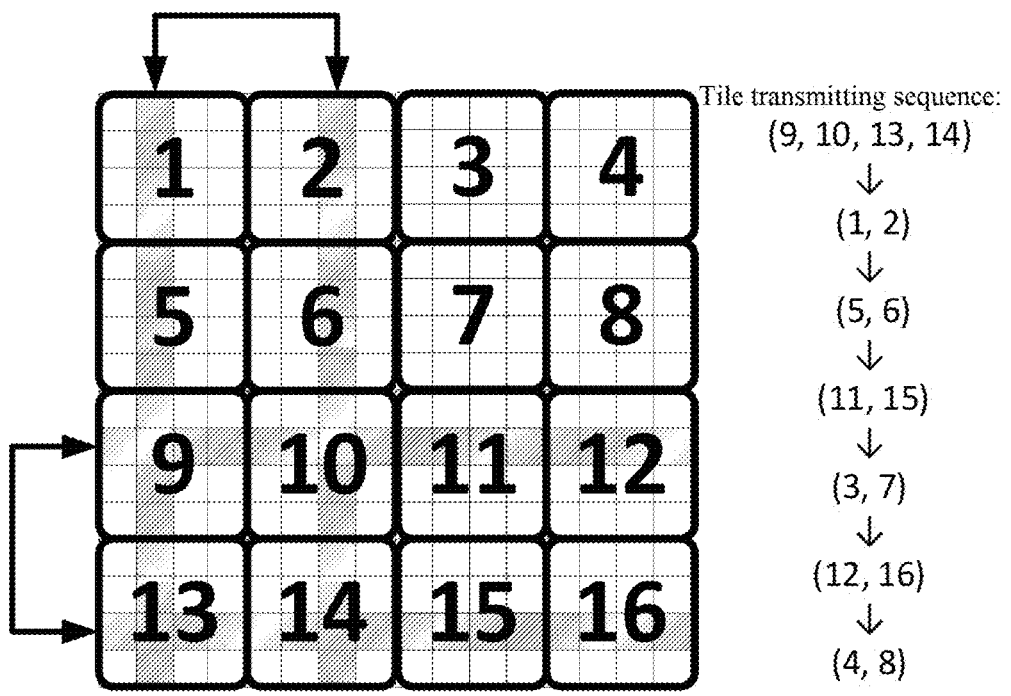
FIG. 13 is a schematic diagram of matrix global data recombination in one embodiment of the disclosure.

By setting a proper tile data recombination mode and a reasonable tile scheduling strategy, various data recombination, such as arbitrary row interaction, and column exchange, in a full matrix range can be completed. An example for completing matrix global row and column exchange is given below. In this example, tiles requiring data exchange form a direct dependence relationship with each other. Wherein the tiles (9, 10, 13 and 14) need to be subjected to row and column exchange at the same time, so that a direct dependence relationship of the four tiles is formed. In addition, the tiles (1 and 2) and the tiles (5 and 6) need to complete column exchange, the tiles (11 and 12) and the tiles (15 and 16) need to complete row exchange, and the tiles form a direct dependence relationship. The global scheduler sets a transmitting sequence as shown in FIG. 13 according to the dependence relationship. The tiles transmitted at the same moment complete row/column exchange in the data recombination network. Through the above operation, the global matrix row and column exchange can be completed without extra overhead.

In another embodiment, arbitrary data recombination comprises row exchange, column exchange, transposition, and data rearrangement.

In another embodiment, the on-chip cache unit is implemented to be partitioned into tile data, local dependence data, and global dependence data.

According to the embodiment, the size of the partition is preset according to resource limitation and algorithm requirements during system design. The data dependence controller manages all read-write operations on the local dependence data and the global dependence data.

In another embodiment, it is given that the computing architecture can effectively complete a matrix inversion and linear equation set solving algorithm based on the Gauss-Jordan elimination (hereinafter referred to as GJE algorithm).

The GJE algorithm is a classical algorithm in linear algebra and is one of algorithms frequently used in scientific computing. Due to good computing parallelism and relatively simple computing operation, the GJE algorithm is selected as a basic algorithm for calculating linear equations, matrix inversion, LU decomposition and the like by many parallel computing systems. The purpose of the GJE algorithm is to convert any square matrix into a unit matrix through a series of iterative elementary row transformation. For a matrix A of the size of N*N, the GJE algorithm needs N iterations in total, and in the ith iteration, the GJE can convert the ith column of the matrix A into a unit matrix. For the ith iteration, the flow is as follows:

(1) pivoting: searching [i: N−1] elements in the ith column of a matrix A, and selecting an element $a_{k,\ i}$ with the maximum absolute value as a pivot element, wherein the kth row corresponding to the element is called a pivot row; the process is called partial pivoting.

(2) pivot row exchanging: exchanging the positions of the pivot row (namely the kth row) and the ith row of the matrix A; wherein the current pivot row becomes the ith row of the matrix A.

(3) elimination: updating the values of the elements $a_{x,\ y}$ of all other rows except the pivot row (namely the ith row) according to the following formula: $a_{x,y}=a_{x,y}-(a_{i,i}/a_{x,i})*a_{i,y}$. Wherein $(a_{i,i}/a_{x,i})$ is called an elimination coefficient. After the updating, elements in the ith column of the matrix A, except the pivot element, are all eliminated to be 0.

(4) normalization: updating all elements $a_{i,y}$ of the pivot row according to the following formula: $a_{i,y}=a_{i,y}/a_{i,I}$. After this update, the pivot element is normalized to 1. At this point, the ith iteration of the GJE algorithm is ended.

The above iteration is continuously carried out for N times until the matrix A is completely converted into the unit matrix.

The GJE algorithm can be used to calculate a solution or an inverse matrix of a system of linear equations.

For a linear equation set: AX=Y, A and Y can be combined into an enhanced matrix [AY], then a GJE algorithm is executed on A, and the matrix Y follows elementary row transformation of the matrix A. When A is eliminated into a unit matrix, Y is converted into a solution X of an equation set.

For solving an inverse matrix $A^{-1}$ of a matrix A, A and a unit matrix I with the same size can be synthesized into an enhanced matrix [A|I], then a GJE algorithm is executed on A, and the matrix I follows elementary row transformation of the matrix A. When A is eliminated into a unit matrix, I is converted into an inverse matrix $A^{-1}$.

In each iteration, one column of the matrix A is eliminated into a unit matrix, and at the same time, one column in the unit matrix on the right side in the enhanced matrix is converted into one column of an inverse matrix $A^{-1}$. Due to the corresponding relationship, only columns of a non-unit matrix can be stored in actual computing, so that the overall matrix storage overhead is reduced to ½ of that of an original algorithm. However, the optimization mode has a problem that the occurrence sequence of the columns of the inverse matrix $A^{-1}$ is random due to the fact that the step of partial pivoting exists, so that the matrix A is subjected to the random row exchange. Due to the fact that the columns can only be stored according to the occurrence sequence of the columns of $A^{-1}$, the sequence of these columns in the memory is disordered. Therefore, in actual computing, the columns of the inverse matrix $A^{-1}$ need to be recovered through reordering of the columns.

In this embodiment, the matrix is divided into tiles of the size of 8*8. Each column of tiles is used as a tile group. According to the GJE algorithm, in the computing process, except for elements of a matrix tile, the following types of dependence data are also involved: pivot row elements, the pivot element and pivot column elements. Wherein the pivot column elements are used for calculating elimination coefficients of all rows of the matrix during elimination.

Figure 14:
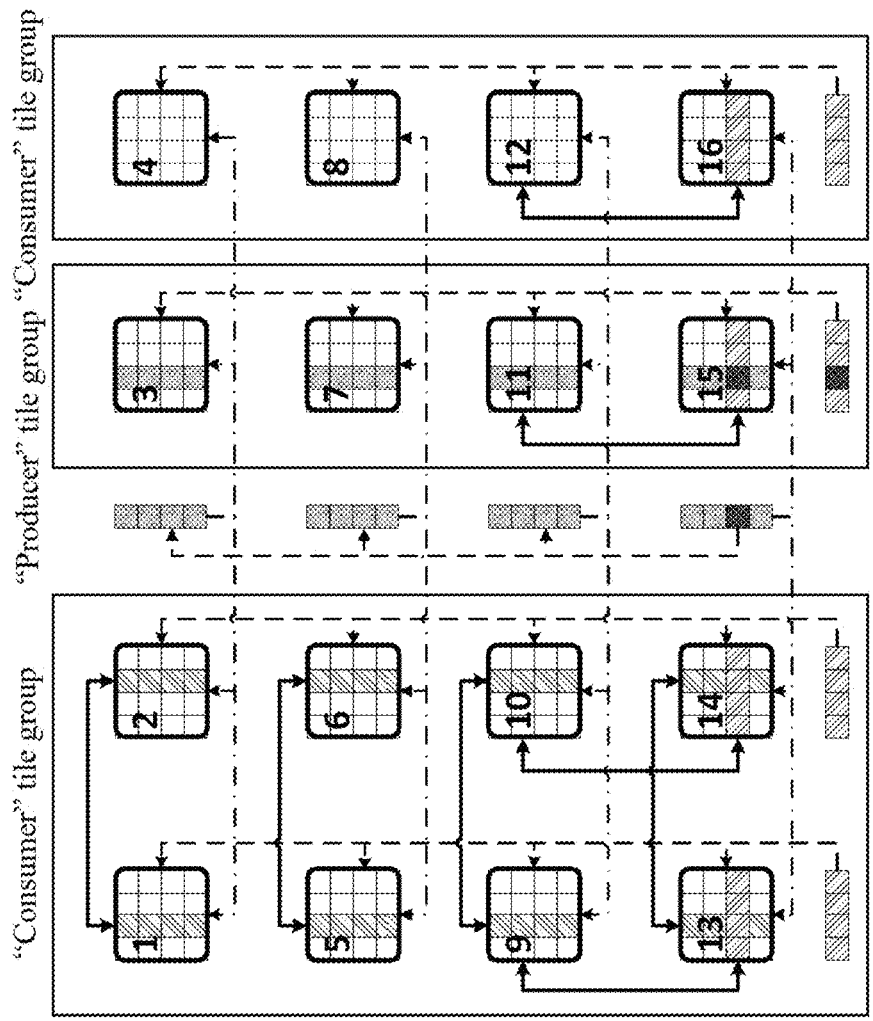
FIG. 14 is a diagram of a tile dependence relationship in matrix inversion computing based on GJE in one embodiment of the disclosure.
Figure 14:
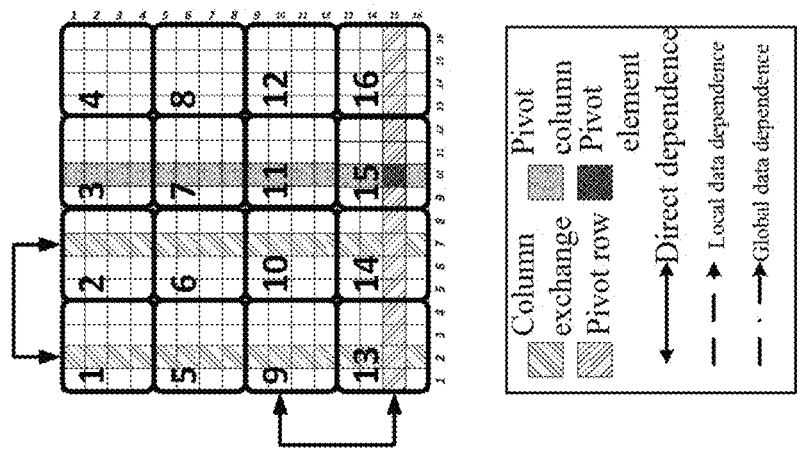

By taking GJE-based matrix inversion computing as an example, assuming that a matrix on the left side of FIG. 14 is in a state that elimination and iteration have reached the tenth time. Wherein the right element is a matrix A, and the left element is an inverse matrix $A^{-1}$. As shown in the figure, in order to eliminate the tenth column, the maximum value of the A[10:16, 10] element in the tenth column of the matrix needs to be found as a pivot element, and the element is A[15, 10] after searching. In the following iteration process, the following tasks need to be completed:

(1) exchanging row 15 and row 10 of a matrix A;
(2) calculating elimination coefficients of each row by using the pivot element and the pivot column elements;
(3) carrying out elimination operation on each row by using the pivot element and the elimination coefficients;
(4) normalizing a pivot row; and
(5) exchanging the column 2 and the column 8 of the inverse matrix $A^{-1}$ in order to restore the correct column sequence of the inverse matrix $A^{-1}$.

In this embodiment, all tiles in each tile column form one tile group. In combination with the computing task, the dependence relationship between the tiles can be obtained, as shown in the right side in FIG. 14. Wherein a direct dependence relationship and two indirect dependence relationships, namely local data dependence and global data dependence, are respectively identified. It can be seen that data recombination among the tiles forms a direct dependence relationship. Local data in each tile group depends on the pivot row elements from the tile group of the column. In addition, each tile group needs to use the elimination coefficients computed by the pivot element and the pivot column to complete the elimination operation. Therefore, the tile group where the pivot element is located takes the role of the "producer" tile group, and the elimination coefficient generated by the pivot element in computing is stored as global dependence data and is used by other tile groups. Meanwhile, due to the fact that data exchange exists between the column 2 and the column 8, a direct dependence relationship is formed between the corresponding tiles, and the two tile groups corresponding to the two columns are combined into the same tile group. Therefore, in the time as shown in FIG. 8, there are one "producer" tile group and two "consumer" tile groups.

For the dependence relationship shown in FIG. 14, the global scheduler determines the transmitting sequence of the tiles according to the scheduling principle. That is, the producer tile is prior to the consumer tile, and the tiles with the direct dependence relationship are all continuously transmitted. Therefore, the final transmitting sequence of the tiles in FIG. 14 is (11, 12)→(3, 7)→(12, 16)→(4, 8)→(9, 10, 13, 14)→(1, 2)→(5, 6).

It needs to be noted that the above scheduling strategy does not consider the situation of tile reuse. In fact, according to a GJE algorithm and tile group division in FIG. 14, it can be known that only elimination coefficients corresponding to the pivot column need to be shared among tile groups. As the pivot column is gradually shifted from left to right in the matrix A along with the number of iterations, the pivot column can sequentially exist in one or more continuous tile groups in continuous GJE iterations.

In this case, the "producer" tile group where the pivot element is located will be "producer" all the time in a plurality of continuous iterations. That is to say, the "producer" tile group can be reused for multiple times to carry out multiple GJE elimination iterative computations, and global dependence data generated by each iteration is recorded. Then other "consumer" tile groups can be reused to complete multiple iterations based on the global dependence data.

For an example in FIG. 14, producer tile groups <3, 7, 11, 15> can continuously complete elimination iterations of columns 9-12, and then other tile groups continuously complete multiple elimination iterations. In this way, for an example in FIG. 14, the number of reuse per tile is 4. Furthermore, the tile groups <3, 7, 11, 15> and <4, 8, 12, 16> can be combined into a large tile group <3, 7, 11, 15, 4, 8, 12, 16>. The tile group can continuously complete 8 times of elimination iterations, and in this case, the reuse coefficient of each tile is increased to 8. By improving the reuse rate of the tiles, data transfer between the main memory and the on-chip cache can be effectively reduced, and the computing efficiency is improved. In actual deployment, the optimal number of times of tile reuse can be set according to factors such as on-chip computing power and off-chip main memory bandwidth, and then the size of the tile group is set. By setting the optimal number of times of tile reuse, the access time of an off-chip main memory can be completely covered in the on-chip computing time, and the computing array utilization rate close to 100% can be theoretically achieved.

Figure 15:
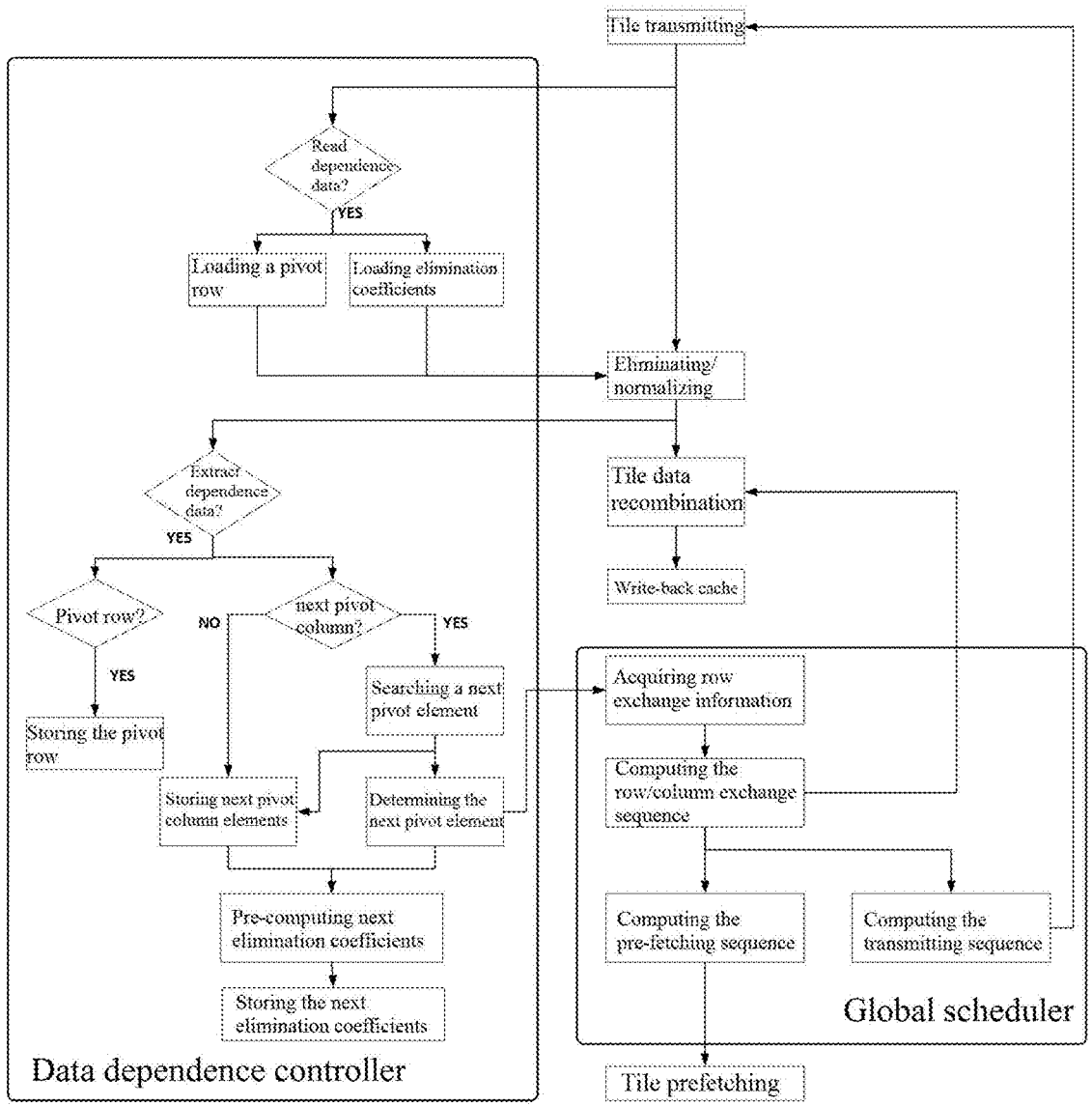
FIG. 15 is a complete computing flowchart of matrix inversion in one embodiment of the disclosure.

By taking matrix inversion computing as an example, the overall computing process of the embodiment is as shown in FIG. 15.

In this embodiment, the trunk computing process comprises the steps of tile transmitting, elimination, data recombination and write-back cache. The tile transmitting module can transmit at most two tiles in each period. According to a scheduling strategy, the same tile group can be transmitted for multiple times, so that reuse of tile computing is realized.

The main control process comprises data dependence control and global scheduling control.

The dependence data control mainly aims at pivot row data and elimination coefficients corresponding to the pivot column. Wherein the pivot row data is local dependence data, is extracted and stored at the beginning of computing of each tile group, and is abandoned after computing of the tile group is ended. While the elimination coefficient is global dependence data and needs to be stored in a cache for a long time. Computing of elimination coefficients depends on values of pivot column elements and values of the pivot element, and pre-computing needs to be conducted in the iteration process. In other words, when iteration of the kth column is eliminated, the pivot element and elimination coefficients of the (k+1)th column are pre-computed. Therefore, the data dependence controller needs to judge whether the tile contains the pivot column corresponding to the next iteration (namely, the (k+1)th column, which becomes the next pivot column in the figure). If so, the next pivot column is cached, and the maximum element is searched as the pivot element. After this, the data dependence controller also invokes the auxiliary computing array to compute the elimination coefficient corresponding to the next iteration. Finally, the elimination coefficient is stored in a cache as global dependence data. It needs to be noted that the dependence data extraction and computing process and the trunk computing process are parallel, and the trunk computing process cannot be blocked.

The workflow of the global scheduler is also described in the flow chart in FIG. 15. The global scheduler is responsible for generating a transmitting sequence and a prefetching sequence of the tiles. As mentioned above, in the embodiment, the tiles in each column are divided into a tile group. A scheduling strategy of the global controller mainly comprises the following factors:

(1) the dependence relationship between different tile groups is determined based on the elimination coefficient. The tile group where the pivot column is located is scheduled prior to other tile groups. The same tile group is reused for multiple times.

(2) The dependence relationship of different tiles in the same tile group is determined based on the pivot row elements. The tile containing the pivot row is scheduled prior to other tiles.

(3) Global matrix row exchange needs to be carried out due to partial pivoting. Tiles needing row exchange form a direct dependence relationship and need to be transmitted at the same time.

(4) Due to disorder of the inverse matrix $A^{-1}$, column exchange of the matrix A-1 needs to be carried out. Tiles needing column exchange form a direct dependence relationship and need to be transmitted at the same time.

In the above factors, (1) and (2) only depend on the matrix scale and the system resource limitation, and are set offline. (3) and (4) are generated by online dynamic computing. According to the previously introduced GJE algorithm, (3) and (4) both depend on the partial pivoting process, namely the row exchange condition of the matrix A. Therefore, the global scheduler needs to obtain the row exchange information of the matrix A in time, and determines the column exchange sequence of the inverse matrix $A^{-1}$ which needs to be completed subsequently according to the information. Finally, the global scheduler can generate a transmitting and prefetching sequence of the tiles by integrating row exchange and column exchange requirements.

The process can be seen in the flow chart of FIG. 15.

In another embodiment, the performance test of the embodiment is completed by simulation. The simulation experiment is based on RTL codes, an IP simulation model of DDR/SRAM and an IP model of a floating point arithmetic unit. The system parameters of the embodiment are as follows: the working frequency is 800 MHz; the tile size is 8*8; the scale of the main computing array is 128×32-bit FP MAC Unit; the scale of the auxiliary computing array: 8×32-bit FP Division Unit; the scale of the on-chip cache is 776 KB; and the scale of the BENES network is 128×32-bit input.

Wherein the working frequency is obtained by integrating RTL codes, an IP simulation model of a DDR/SRAM capable of being integrated and an IP model of a floating point arithmetic unit through a Synopsys Design Compiler (DC) tool, and the working frequency can be regarded as the practical and feasible working frequency.

The test sets are random floating-point number matrixes of different sizes. According to the embodiment, matrix inversion and linear equation set solving operation are completed on a test set matrix, and operation delay is recorded. A tested control group is a current mainstream common high-performance large-scale matrix operation library: MKL, LAPACK and CUBLAS. Wherein the MKL (version 3.8.0) and the LAPACK (version 3.8.0) work on an Intel XEON Gold 6146 platform, and the CUBLAS (version 10.1) works on an NVIDIA GPU RTX 2080 Ti platform. In the experiment, parameter tables of different platforms are shown in Table 3.

TABLE 3

| Computing platform | Working frequency | Peak computing power (FLOPS) | Cache size MB | DDR bandwidth |
|---|---|---|---|---|
| Intel XEON Gold 6146 | 4.2 GHz | 134 G | 24.73 (L3) | 70 GB/s (DDR4) |
| NVIDIA RTX 2080 Ti | 1.5 GHz | 13T | 5.5 (L2) | 616 GB/s (DDR6) |
| the invention | 800 MHz | 102 G | 0.77 | 25 GB/s (DDR4) |

For matrix inversion operation, the test set tests the performance of the matrix range 32-2048. For a linear equation set solving AX=Y, a test set tests the performance of a matrix range 32-2048, and different from inverse operation, in equation set solving, the size of Y also affects the overall performance, so that the influences of different Y sizes on the performance are respectively tested. The sizes of Y are respectively N*8, N*32 and N*64.

Figure 16:
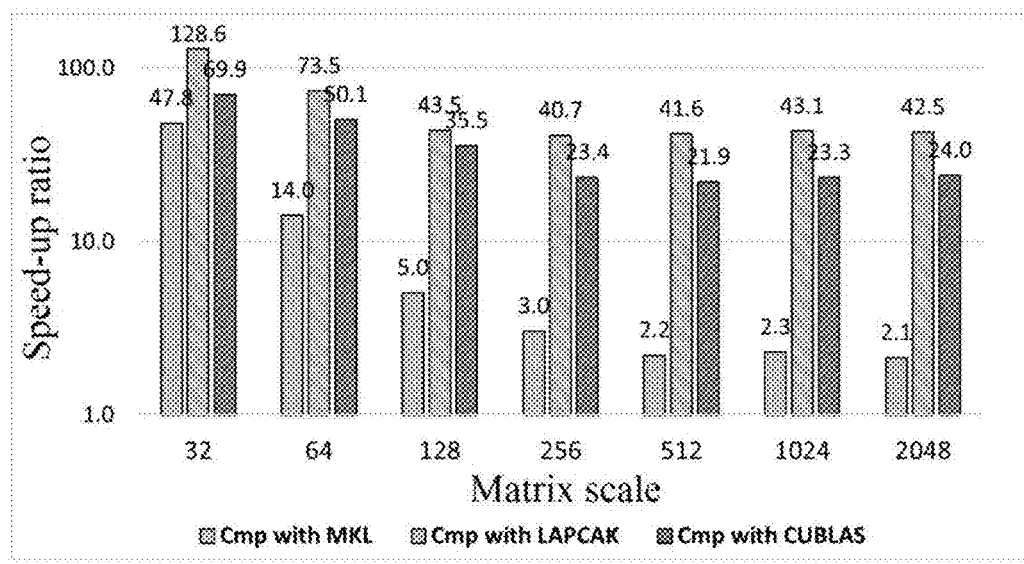
FIG. 16 is a comparison diagram of matrix inversion operation speed-up ratio of the architecture in one embodiment of the disclosure compared with other computing platforms.

Table 4 lists the delay (unit: second) of completing matrix inversion operation of different platforms on matrixes of various sizes, and FIG. 16 lists the speed-up ratio of the computing architecture compared with other control groups. The ordinate in FIG. 16 is the "speed-up multiple of the computing architecture compared with other platforms". That is to say, the ordinate is the ratio of the computing time of other platforms to the computing time of the computing architecture, for example, in the matrix scale 32 in FIG. 16, the computing time of MKL, the computing time of LAPACK and the computing time of CUBLAS are 47.8 times, 128 times and 69 times the computing time of the computing architecture respectively.

TABLE 4

| Matrix Order | This computing architecture | LAPACK | MKL | CUBLAS |
|---|---|---|---|---|
| 32 × 32 | 0.0007 | 0.093 | 0.034 | 0.050 |
| 64 × 64 | 0.0043 | 0.319 | 0.061 | 0.217 |
| 128 × 128 | 0.0286 | 1.244 | 0.144 | 1.018 |
| 256 × 256 | 0.2034 | 8.281 | 0.615 | 4.75 |
| 512 × 512 | 1.4878 | 61.91 | 3.267 | 32.64 |
| 1024 × 1024 | 11.534 | 497.21 | 26.735 | 268.40 |
| 2048 × 2048 | 92.274 | 3920.8 | 195.91 | 2213.90 |

Figure 17:
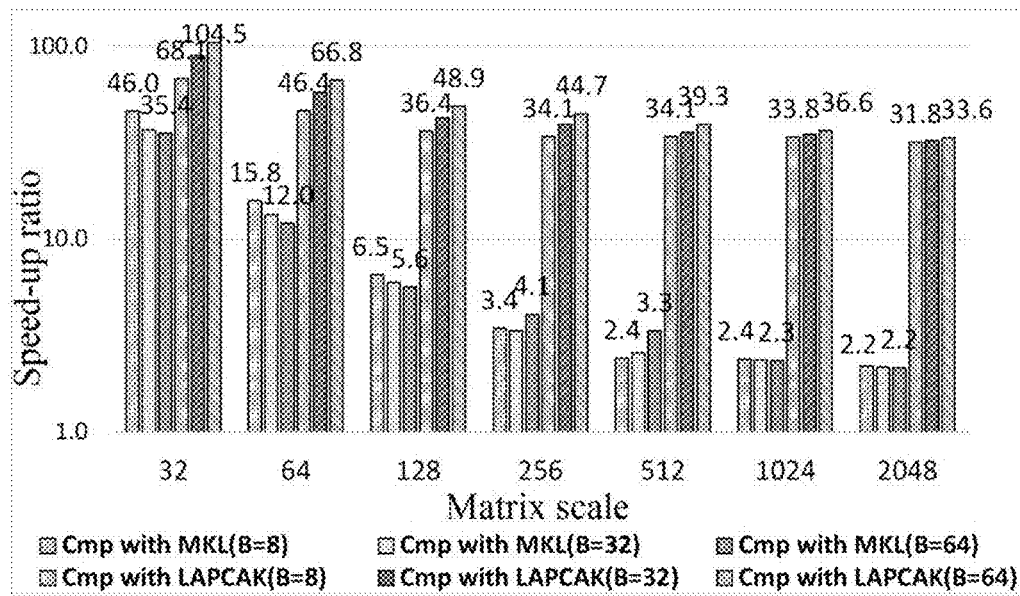
FIG. 17 is a comparison diagram of linear equation set solving operation speed-up ratio of the architecture in one embodiment of the disclosure compared with other computing platforms.

Table 5 lists the delay (unit: second) of completing matrix inversion operation of different platforms on matrixes of various sizes, and FIG. 17 lists the speed-up ratio of the invention compared with other control groups.

TABLE 5

| Matrix Order | This computing architecture | | | LAPACK | | | MKL | | |
|---|---|---|---|---|---|---|---|---|---|
| Y = | 8 | 32 | 64 | 8 | 32 | 64 | 8 | 32 | 64 |
| 32 × 32 | 4e-4 | 7e-4 | 1e-3 | 0.03 | 0.06 | 0.10 | 0.02 | 0.02 | 0.03 |
| 64 × 364 | 2e-3 | 3e-3 | 4e-3 | 0.11 | 0.20 | 0.31 | 0.04 | 0.05 | 0.05 |
| 128 × 128 | 0.01 | 0.02 | 0.02 | 0.55 | 0.81 | 1.18 | 0.10 | 0.11 | 0.14 |
| 256 × 256 | 0.10 | 0.11 | 0.13 | 3.45 | 4.60 | 6.12 | 0.35 | 0.39 | 0.56 |
| 512 × 512 | 0.71 | 0.77 | 0.85 | 24.1 | 27.6 | 33.5 | 1.71 | 1.99 | 2.86 |
| 1024 × 1024 | 5.36 | 5.61 | 5.93 | 181 | 196 | 217 | 12.7 | 13.3 | 13.9 |
| 2048 × 2048 | 42.4 | 43.4 | 44.7 | 1.3k | 1.4k | 1.5k | 93.2 | 94.4 | 96.5 |

According to the experimental results, the method is obviously superior to other computing platforms on matrixes of various scales, and still has a very high speed-up ratio in computing of large-scale matrixes. Particularly, the MKL is a high-performance scientific computing library with the best effect at present. According to the computing architecture, in large-scale matrix operation, the speed-up ratio of two times can be stably obtained relative to MKL. In addition, the resource consumption of the embodiment is far lower than that of other computing platforms, the on-chip cache of the embodiment is only 1/30 of the Intel CPU, and the DDR bandwidth is far lower than that of other platforms. The comparison further shows that the architecture can realize high-efficiency use of the on-chip cache resources, so that the performance far better than that of a traditional computing method is obtained under the condition of fewer resources.

Theoretically, any matrix computing can design the scheduling strategy by analyzing the dependence relationship between the tiles of the matrix computing, and then the scheduling strategy is deployed in the computing architecture. It needs to be noted that for different matrix algorithms, needed data dependence computing modes and tile computing modes are possibly different, and therefore corresponding computing modules and assembly lines need to be customized according to the different matrix algorithms. However, the overall structure, the computing process, the scheduling strategy algorithm, the functions of each module and the like of the architecture are not changed.

Meanwhile, due to the fact that a high-reusability scheduling strategy needs more on-chip storage resources to store more global dependence data, support of the architecture on a large-scale matrix depends on the number of the on-chip storage resources and the scale of a computing array. In actual deployment, appropriate storage resources and computing arrays can be customized according to actual algorithm conditions and matrix sizes.

Although the embodiment of the invention is described in combination with the attached drawings, the invention is not limited to the specific embodiment and the application field, and the specific embodiment is only schematic, instructive and not restrictive. Those having ordinary skill in the art can also make various forms under the enlightenment of the description and under the condition of not leaving the protection scope of the claims of the invention, and all the forms belong to the protection scope of the invention.

The invention claimed is:
1. Computing architecture, comprising an off-chip memory, an on-chip cache unit, a transmitting unit, a pre- recombination network, a post-recombination network, a main computing array, a data dependence controller and a global scheduler, wherein the off-chip memory is configured to store all large-scale data in a format of tiles, wherein the large-scale data is divided into a plurality of tiles of the same size;

the on-chip cache unit is configured to store data of the tiles and dependence data required for computing;

the transmitting unit is configured to read the data of the tiles from the on-chip cache unit according to a sequence specified by a scheduling algorithm and sending the data of the tiles to the pre-recombination network;

the main computing array is configured to compute data of the tiles from the pre-recombination network;

the pre-recombination network is configured to carry out arbitrary data recombination on the data of the tiles before the data of the tiles is computed;

the post-recombination network is configured to carry out arbitrary data recombination on the data of the tiles after the data of the tiles is computed;

the data dependence controller is configured to process a data dependence relationship between the data of the tiles; and the global scheduler is configured to execute a preset scheduling algorithm to control prefetching, transmitting, computing, data recombination and data dependence relationship processing of the data of the tiles.

2. The computing architecture according to claim 1, wherein the data of the tiles is stored in a memory.

3. The computing architecture according to claim 1, wherein the data dependence relationship comprises direct dependence and indirect dependence; the direct dependence means that the data of the tiles needs to directly participate in operation, and an obtained operation result is directly used for updating the data of the tiles or serves as intermediate dependence data; the indirect dependence means that the computing of the data of a certain tile needs to be completed by means of the data in other tiles.

4. The computing architecture according to claim 1, wherein the data dependence controller is also used for judging whether an operation of a current tile depends on previously stored data of the tile, and if so, reading related dependence data and providing the related dependence data to the main computing array for the operation of the data of the current tile.

5. The computing architecture according to claim 1, wherein the dependence data comprises local dependence data and global dependence data; the local dependence data refers to intermediate data which is generated by a certain tile group of the plurality of tiles and only needs to be used in the operation of the tile group; the global dependence data refers to intermediate data which is generated by a certain tile group of the plurality of tiles and needs to be used in the operation of both the tile group and other tile groups.

6. The computing architecture according to claim 1, wherein the on-chip cache unit is implemented to be partitioned into tile data, local dependence data and global dependence data.

7. The computing architecture according to claim 1, further comprising:
a prefetching unit, used for completing transfer of the data of the tiles between the off-chip memory and an on-chip cache;
a write-back cache unit, used for writing the data of the tiles back to the on-chip cache unit after the data of the tiles is computed; and
an auxiliary computing array, used for assisting the data dependence controller in extraction, pre-processing and computing of the dependence data.

8. The computing architecture according to claim 7, wherein the data dependence controller is further used for judging whether a current tile contains dependence data on which a subsequent tile depends or not, if so, extracting, computing and storing the dependence data, wherein the computing of the dependence data is completed by the auxiliary computing array.

9. The computing architecture according to claim 1, wherein the transmitting unit is also used for adding a corresponding tag bit for each tile when transmitting each tile.

10. The computing architecture according to claim 9, wherein the tag bit indicates a computing task needing to be executed by the tile, data dependence information and data recombination information of the tile.

* * * * *